United States Patent Office 3,533,968
Patented Oct. 13, 1970

3,533,968
DIALKYLTIN AND DIALKYLGERMANIUM
CARBORANE POLYMERS
Stelvio Papetti and Hansjuergen A. Schroeder, Hamden,
Conn., assignors to Olin Mathieson Chemical Corporation, a corporation of Virginia
No Drawing. Filed July 19, 1967, Ser. No. 654,385
Int. Cl. C08g 33/18
U.S. Cl. 260—2                         11 Claims

ABSTRACT OF THE DISCLOSURE

A series of dialkyltin and dialkylgermanium homopolymers and copolymers of m-carborane and p-carborane have been prepared by the reaction of the dialkylmetal dihalide with dialkali-metal m-carborane and dialkalimetal p-carborane. These polymers are useful in preparing fiber-reinforced structures capable of withstanding high temperatures and are also valuable as components of solid fuels.

This invention relates to tin and germanium containing carborane polymers having the formula

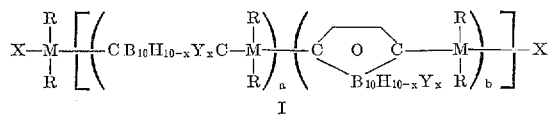

I wherein M is tin or germanium; X is halogen, and preferably chlorine, bromine or iodine; R is alkyl; Y is chlorine or bromine; $x$ is an integer from 0 to 10; and $a$ and $b$ are independently selected integers, provided that the sum of $a$ and $b$ is at least 2.

The reaction of carborane compounds with various Group IV–A metal-containing materials to provide monomeric metal-containing carboranes has previously been reported in the literature. For example, S. Papetti and T. L. Heying in J. Inorg. Chem., 2, 1105 (1963) and 3, 1448 (1964), describe the reaction of dimethylsilicone dichloride with the dilithium salts of both o- and m-carborane respectively to provide monomeric dichlorosubstituted compounds exclusively. The synthesis of bis(C-phenyl-o-carboranyl)-dichlorogermane by the reaction of germanium tetrachloride with C-phenyl-o-carboranyllithium has been reported by L. I. Zakharkin et al. in J. Organometal. Chem., 4, 211 (1965). These authors also describe the preparation of several tin-containing monomeric o-carboranes, such as bis(C-phenyl-o-carboranyl)-dichlorosilane, an o-carborane substituted with two dialkyltin moieties, and an alkyl substituted cyclic compound containing a distannocyclohexane skeleton.

Now it has been found that selected tin and germanium compounds react with certain m- and p-carborane derivatives to provide a series of homopolymers and copolymers of varying molecular weights having the Formula I. Thus, homopolymers of dialkyltin m-carborane, dialkyltin p-carborane, dialkylgermanium m-carborane and dialkylgermanium p-carborane and copolymers containing randomly distributed units of two or more of the aforementioned dialkylmetal carboranes have been obtained according to this invention.

More specifically, the polymers I are prepared by reacting a dialkali-metal m-carborane, a dialkali-metal p-carborane or a mixture thereof with dialkyltin dihalide, dialkylgermanium dihalide or a mixture thereof in accordance with the following equation

WZW + R₂MX₂ ⟶ I
II       III wherein Z is an m-carborane or p-carborane moiety or a chlorinated or brominated derivative thereof; W is alkali metal, i.e., sodium, potassium, lithium or cesium; and R, M and X are as previously described.

Where one of the above-described dialkali-metal carboranes is reacted with one dialkylmetal dihalide, a homopolymer is obtained, whereas random copolymers are provided by employing mixtures of either or both reactants in the previously-described reaction. For example, a random copolymer is obtained by reacting a mixture of dilithio p-carborane and dilithio m-carborane with dimethyltin dihalide, or by reacting dilithio p-carborane with a mixture of dialkyltin dihalide and dialkylgermanium dihalide. Various other combinations provide a wide series of random copolymers having the Formula I.

The dialkali-metal carboranes and derivatives thereof represented by the Formula II are conveniently provided by the reaction of p-carborane or m-carborane, or the chlorinated or brominated carboranes with an alkylalkalimetal compound according to the process described in U.S. Pat. 3,226,429.

M-carborane, otherwise known as 1,7-dicarbaclovododecaborane, and its chlorinated and brominated derivatives are generally designated by the formula $$HCB_{10}H_{10-x}Y_xCH$$

wherein Y is chlorine or bromine and $x$ is an integer from 0 to 10 inclusive; whereas p-carborane, i.e., 1,12-dicarbaclovododecaborane, and its chlorinated and brominated derivatives are represented by the formula

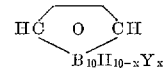

wherein Y and $x$ are as previously described.

The preparation of the chlorinated carboranes is fully described in copending application Ser. No. 414,947, which is incorporated by reference herein in its entirety.

Brominated carboranes are readily provided by reacting a carborane compound with bromine in the presence of an aluminum halide catalyst.

While any dialkylmetal dihalide III can be employed in the preparation of the polymers of this invention, preferred embodiments employ compounds wherein R is lower alkyl, that is alkyl having 1 to 3 carbon atoms. Thus, typical preferred dialkylmetal dihalides include dimethyltin dichloride, diethyltin dichloride, di-n-propyltin dichloride, di-iso-propyltin dichloride, methylethyltin dichloride, ethyl-iso-propyltin dichloride, dimethyltin dibromide, ethylmethyltin diiodide, dimethylgermanium dichloride, diethylgermanium dichloride, ethyl-iso-propylgermanium dichloride, methylethylgermanium dibromide, propylmethylgermanium diiodide and the like.

Although any polymer having the Formula I can be provided according to this invention, preferred embodiments include those polymers I wherein $a$ and $b$ are independently selected integers from 0 to about 50, with the proviso that the sum of $a$ and $b$ is an integer from 2 to about 50.

The preparation of the polymers of this invention can be conveniently carried out in an inert reaction medium. Thus, ethers such as diethylether, dimethylether, methyl iso-propylether, tetrahydrofuran and the like; aromatic hydrocarbons such as benzene, xylene, toluene, etc. and aliphatic hydrocarbons such as pentane, hexane, heptane, Decalin and the like can be employed. Equimolar amounts of the reactants are preferably employed although an excess of either the carborane material or the metal-containing compound can be used.

While the reaction proceeds over a wide temperature range, temperatures between about 0° and 30° C. are preferably employed, with the reaction being completed at the reflux temperature of the particular solvent employed in the reaction. The desired polymers are obtained in high yield and excellent purity and are readily isolated by conventional techniques such as filtration, distillation, recrystallization and the like.

The tin and germanium containing m- and p-carborane polymers of this invention have a wide variety of useful applications. For example, they are particularly effective as binders in fiber-reinforced structures which are used in aircrafts, rockets, and other structures where heat and oxidation resistant materials are required.

Thus, to illustrate this application, 30 g. of a blend consisting of 50 percent by weight of the dimethyltin-m-carborane polymer I having 30 repeating units and 50 percent by weight of spinning grade Chrysotile asbestos were placed in a 2 x 5 in. steel mold which had been pre-treated with a fluorocarbon release agent. The mold was placed in a press which had been preheated to a platen temperature of about 450° F. and a pressure of 2,000 p.s.i. was applied immediately. When the mold temperature reached approximately 430° F., a slight pressure drop indicated resin flow. The mold was maintained at 450° F. and 2,000 p.s.i. for one hour, and the sample removed to provide a 2 x 5 in. panel having a thickness of 1/10 in. This panel was postcured in an air circulating oven for three days; the temperature of the oven was raised gradually from ambient to 800° F. over the first two days with final treatment taking place at 800° F. The resulting cured composite had a tensile strength of 1,200 p.s.i. After exposure to air at a temperature of 800° F. for one-hundred hours, the composite still exhibited the original tensile strength. A dimethyl-p-carborane polymer having 20 repeating units, a dimethyltin-monobromo-m-carborane polymer and a dimethylgermanium-m-carborane polymer having 5 repeating units were similarly employed in the preparation of fiber-reinforced structures which exhibited excellent heat resistant and oxidation resistant properties.

The polymers of this invention are also useful as fuels and when incorporated with suitable oxidizers, such as ammonium perchlorate, potassium perchlorate, sodium perchlorate, ammonium nitrate, etc., yield solid propellants suitable for rocket power plants and other jet propelled devices. These solid propellants are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In formulating a solid propellant composition employing one of the materials produced in accordance with the present invention, generally from 10 to 35 parts by weight of the polymer I and from 65 to 90 parts by weight of oxidizer, such as ammonium perchlorate, are present in the final propellant composition. In the propellant, the oxidizer and the polymer are formulated in intimate admixture with each other, as by finely subdividing each of the materials separately and thereafter intimately admixing them. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, for example, 20 parts by weight of dimethylgermanium-p-carborane polymer I having 8 repeating units and 80 parts by weight of ammonium perchlorate is admixed with a high solids content solution of 10 parts by weight, based on the weight of the polymer and oxidizer, of a partially condensed urea-formaldehyde resin. The ingredients are thoroughly mixed with simultaneous removal of the solvent, and following this the solvent-free mixture is molded into the desired shape, as by extrusion. Thereafter the resin is cured by heating at moderate temperatures. Solid propellant compositions containing a dimethyltin-dimethylgermanium-m-carborane random copolymer and a dimethyltin-m-carborane-dimethyltin-p-carborane copolymer respectively, are also excellent propellants.

The following examples serve to illustrate the preparation of various tin and germanium containing carborane polymers in accordance with the practice of this invention.

EXAMPLE 1

A slurry of dilithio-m-carborane in 500 ml. of ether, prepared from m-carborane (7.2 g.; 0.05 mole) and butyllithium (0.11 mole) according to the procedure described in U.S. Pat. 3,226,429, was added, with stirring, to a solution of dimethyltin dichloride (11.0 g.; 0.05 mole) in 500 ml. of ether while maintaining a temperature of 0° C. The resulting slurry was stirred overnight at reflux. Then the ether was removed by distillation and the resulting white solid material washed with water and dried in vacuo over $P_2O_5$. Recrystallization from benzene provided 6.0 g. of solid product, M.P. 217–221° C., molecular weight 2563 (in o-dichlorobenzene at 100° C. using a vapor pressure osmometer). The following analytical data revealed that a dimethyltin-m-carborane polymer having the following formula had been obtained in 42 percent yield.

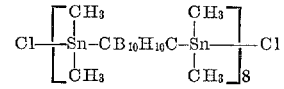

*Analysis.*—Calcd. for $C_{34}H_{134}B_{80}Cl_2Sn_9$ (percent): C, 16.03; H, 5.30; B, 33.97; Cl, 2.78. Found (percent): C, 16.70; H, 5.60; B, 35.43; Cl, 2.30.

EXAMPLE 2

A dilithio-m-carborane slurry in ether was prepared from m-carborane (9.74 g.; 0.675 mole) and butyllithium (0.15 mole). After removal of the ether by distillation, the dilithio-m-carborane was slurried with 200 ml. of xylene. This dilithio-m-carborane slurry was added slowly, with stirring, to a solution of dimethyltin dichloride (14.83 g.; 0.0675 mole) in xylene (100 ml.) while maintaining a temperature of 0° C. The resulting mixture was stirred at ambient temperature for 30 minutes and then refluxed for five hours. After cooling to 20° C., the reaction mixture was filtered to provide a precipitate which was washed successively with water and acetone. Recrystallization from xylene provided 8.8 g. of solid product, M.P. 236–243° C. Vapor pressure osmometry in o-dichlorobenzene at 100° C. revealed that a polymer having a molecular weight of 7060, corresponding to the structure set forth in Example 1 having 24 repeating units, had been obtained in 44.7 percent yield.

EXAMPLE 3

Example 2 was repeated with the exception that hexane was employed as the reaction medium. Recrystallization from xylene provided 11.2 g. of solid product, M.P. 244–247° C. Vapor pressure osmometry in o-dichlorobenzene at 100° C. revealed that a dimethyltin-m-carborane polymer having a molecular weight of 8405 had been obtained in 57 percent yield. This polymer has the structure described in Example 1 containing 28 repeating units.

EXAMPLE 4

Following the procedure of Example 2 but employing Decalin as the reaction medium, a solid material was obtained which was recrystallized from o-dichlorobenzene to provide 4.1 g. of product, M.P. 250–255° C. According to vapor pressure osmometry in o-dichlorobenzene at 100° C., the product had a molecular weight of 9020, corresponding to the dimethyltin-m-carborane polymer described in Example 1 having 30 repeating units.

EXAMPLE 5

A dilithio-p-carborane slurry in 50 ml. of ether, prepared from p-carborane (3.0 g.; 0.0208 mole) and butyllithium was reacted with a solution of dimethyltin dichloride (5.0 g.; 0.0229 mole) in 50 ml. ether following the procedure of Example 2. The solid material thereby obtained was recrystallized from o-dichlorobenzene to provide 3.3 g. of product, M.P. 365–375° C. The following data revealed that a dimethyltin-p-carborane polymer having the following formula had been obtained in 55 percent yield.

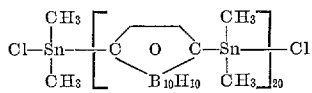

*Analysis.*—Calcd. for $C_4H_{16}B_{10}Sn$ (percent): C, 16.51; H, 5.54; B, 37.17; Sn, 40.78. Found (percent): C, 16.32; H, 5.56; B, 36.72; Sn, 40.28. Mol. wt.: 6050 (vapor pressure osmometry in o-dichlorobenzene at 100° C.).

EXAMPLE 6

Dilithio-p-carborane, prepared from p-carborane (10.0 g.; 0.07 mole) and butyllithium (0.15 mole) was washed with petroleum ether (30–60° C.) and then slurried with 75 ml. of xylene. A solution of dimethyltin dichloride (16.74 g.; 0.07623 mole) in 100 ml. of xylene was added dropwise, at ambient temperature, to the dilithio-p-carborate suspension. The resulting slurry was heated at reflux for six hours and then cooled to ambient temperature. Filtration of the reaction mixture provided a precipitate which was washed successively with water, acetone and ether to yield 14 g. of product, M.P. >400° C. The following analytical data revealed that a dimethyltin-p-carborane polymer containing repeating units having the formula described in Example 5 had been obtained in 69 percent yield. This polymer was insoluble in a wide variety of common organic solvents, including hot o-dichlorobenzene.

*Analysis.*—Calcd. for $C_4H_{16}B_{10}Sn$ (percent): C, 16.51; H, 5.54; B, 37.17; Sn, 40.78. Found (percent): C, 16.83; H, 5.54; B, 36.75; Sn, 40.10.

EXAMPLE 7

A dilithio-p-carborane slurry prepared from p-carborane (2.0 g.; 0.014 mole) and butyllithium was added to a solution of dimethylgermanium dichloride (2.4 g.; 0.014 mole) in 85 ml. of ether and the mixture heated at reflux for three hours. After cooling to 20° C., the reaction mixture was filtered to provide a precipitate which was washed successively with ether and water. Recrystallization by the addition of aqueous ethanol to a solution of the precipitate in boiling o-dichlorobenzene provided 0.4 g. of solid product, M.P. 460–480° C. (dec.). The following analytical data revealed that a product having the following formula had been obtained.

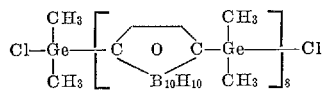

*Analysis.*—Calcd. for $C_{22}H_{86}B_{50}Cl_2Ge_6$ (percent): C, 18.91; H, 6.16; B, 38.69; Ge, 31.18. Found (percent): C, 18.11; H, 6.00; B, 38.37; Ge, 30.49.

The structure of the product was confirmed by vapor pressure osmometry in o-dichlorobenzene at 100° C. which revealed a molecular weight of 1470.

EXAMPLE 8

A dilithio-m-carborane slurry in 200 ml. of ether was prepared from m-carborane (7.22 g.; 0.05 mole) and butyllithium (0.11 mole). Dimethylgermanium dichloride (8.68 g.; 0.05 mole) was added dropwise at room temperature to the dilithium-m-carborane slurry. After the addition was completed, the mixture was stirred at reflux for two hours and then maintained with stirring at room temperature overnight. Evaporation of the reaction mixture provided a solid material which was treated with excess carbon tetrachloride and filtered. The filtrate was evaporated to dryness to provide a solid product which was further dried at 100° C. under vacuum. The product softened above 95° C. Vapor pressure osmometry in o-dichlorobenzene at 100° C. revealed that a polymer having a molecular weight of 1755, corresponding to the following formula had been obtained.

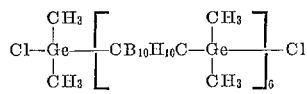

EXAMPLE 9

A slurry of 1,2-dilithio-B-bromo-m-carborane in ether (75 ml.) was prepared from B-bromo-m-carborane (11.16 g.; 0.05 mole) and butyllithium (0.11 mole). Dimethyltin dichloride (12.082 g.; 0.055 mole) was dissolved in 150 ml. of ether and added dropwise to the 1,2-dilithio-B-bromo-m-carborane slurry at 0° C. The resulting slurry was then refluxed for five hours. After cooling to ambient temperature, the reaction mixture was filtered and the precipitate was washed successively with water, acetone and ether. Recrystallization from o-dichlorobenzene provided 13.5 g. of solid product, M.P. 380–383° C. The following analytical data revealed that a dimethyltin-monobromo-m-carborane polymer having the following fromula had been obtained in 73 percent yield. This polymer was insoluble in a variety of organic solvents.

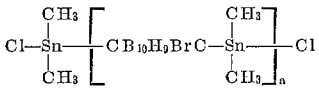

*Analysis.*—Calcd. for $C_4H_{15}B_{10}BrSn$ (percent): C, 12.98; H, 4.09; B, 29.24; Br, 21.60; Sn, 32.08. Found (percent): C, 13.11; H, 4.21; B, 28.58; Br, 21.35; Sn, 31.50.

EXAMPLE 10

To a dilithio-m-carborane slurry in ether (200 ml.) prepared from m-carborane (28.86 g.; 0.2 mole) and butyllithium (0.44 mole) was added, with ice-cooling, a solution of dimethyltin dichloride (21.97 g.; 0.1 mole) and dimethylgermanium dichloride (17.36 g.; 0.1 mole) in ether (300 ml.). After the addition was completed, the reaction mixture was heated to reflux for five hours and then cooled to room temperature and filtered. The filter residue was washed successively with water, acetone and ether to provide 23.6 g. of product, M.P. 350–355° C. The following analytical data revealed that a dimethyltin-dimethylgermanium-m-carborane random copolymer having the following formula had been obtained in 44 percent yield. The polymer was insoluble in a wide variety of organic solvents, including hot o-dichlorobenzene.

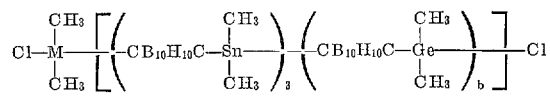

*Analysis.*—Calcd. for $C_8H_{32}B_{20}GeSn$ (percent): C, 17.92; H, 6.02; B, 40.37; Sn, 22.14; Ge, 13.54. Found (percent): C, 17.16; H, 6.12; B, 39.42; Sn, 23.10; Ge, 13.07.

EXAMPLE 11

A slurry of dilithio-m- and p-carborane in ether (100 ml.) was prepared from 7.2 g. (0.05 mole) of m-carborane, 7.2 g. (0.05 mole) of p-carborane and 0.22 mole of butyllithium. To this slurry was added, with ice-cooling, a solution of dimethyltin dichloride (24.17 g.; 0.11 mole) in ether (250 ml.). The reaction mixture was then refluxed for five hours. After cooling to ambient temperature, the precipitate was collected by filtration and washed successively with water, acetone and ether to provide 18 g. of product, M.P. 370–375° C. The following analytical data revealed that a random copolymer containing dimethyltin-m-carborane and dimethyltin-p-carborane moieties and having the following formula had been obtained in 62 percent yield. The polymeric structure was confirmed by the insolubility of the product in a variety of common organic solvents, including hot o-dichlorobenzene.

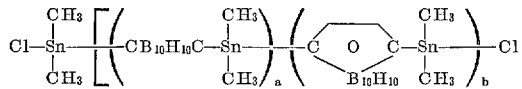

*Analysis.*—Calcd. for $C_4H_{16}B_{10}Sn$ (percent): C, 16.51; H, 5.54; B, 37.17; Sn, 40.78. Found (percent): C, 16.53; H, 5.49; B, 36.61; Sn, 40.50.

What is claimed is:

1. A polymer having the formula

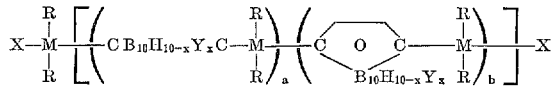

wherein each M is independently selected from the group consisting of tin and germanium; each R is an indepenently selected lower alkyl; X is selected from the group consisting of chlorine, bromine and iodine; each Y is independently selected from the group consisting of chlorine and bromine; each $x$ is an integer from 0 to 10; $a$ is an integer from 0 to about 50 and $b$ is an integer from 0 to about 50, with the proviso that the sum of $a$ and $b$ is an integer from 2 to about 50.

2. The polymer of claim 1 wherein M is tin, R is methyl, X is chlorine, $x$ is 0, $a$ is an integer from 1 to about 50 and $b$ is an integer from 1 to about 50, with the proviso that the sum of $a$ and $b$ is an integer from 2 to about 50.

3. The polymer of claim 1 having the formula

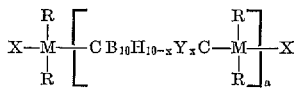

wherein each M is independently selected from the group consisting of tin and germanium; each R is an independently selected lower alkly; X is selected from the group consisting of chlorine, bromine and iodine; each Y is independently selected from the group consisting of chlorine and bromine; $x$ is an integer from 0 to 10; and $a$ is an integer from 2 to about 50.

4. The polymer of claim 3 wherein R is methyl, X is chlorine and $x$ is 0.

5. The polymer of claim 3 wherein M is germanium, R is methyl, X is chlorine and $x$ is 0.

6. The polymer of claim 3 wherein M is tin, R is methyl, X is chlorine, Y is bromine and $x$ is 1.

7. The polymer of claim 3 wherein M is tin, R is methyl, X is chlorine and $x$ is 0.

8. The polymer of claim 7 wherein $a$ is 30.

9. The polymer of claim 1 having the formula

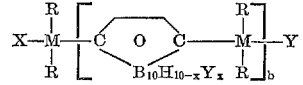

wherein each M is independently selected from the group consisting of tin and germanium; each R is an independently selected lower alkly; X is selected from the group consisting of chlorine, bromine and iodine; each Y is independently selected from the group consisting of chlorine and bromine; each $x$ is an integer from 0 to 10 and $b$ is an integer from 2 to about 50.

10. The polymer of claim 9 wherein M is germanium, R is methyl, X is chlorine and $x$ is 0.

11. The polymer of claim 9 wherein M is tin, R is methyl, X is chlorine and $x$ is 0.

References Cited

Bresadola et al.: "Chemical Communications," vol. 17, Sept. 7, 1966, pp. 623–4.

SAMUEL H. BLECH, Primary Examiner

U.S. Cl. X.R.

260—429.7, 429, 606.5, 37, 838, 849; 149—22